United States Patent
Seibt et al.

(10) Patent No.: US 8,562,008 B2
(45) Date of Patent: Oct. 22, 2013

(54) STABILIZER COUPLING

(75) Inventors: Oliver Seibt, Paderborn (DE); Jürgen Krogmeier, Hövelhof (DE); Igor Illg, Renningen (DE); Friso Berheide, Rheda-Wiedenbrück (DE); Andreas Janzen, Willebadessen-Peckelsheim (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 13/359,160

(22) Filed: Jan. 26, 2012

(65) Prior Publication Data

US 2012/0193885 A1 Aug. 2, 2012

(30) Foreign Application Priority Data

Jan. 28, 2011 (DE) .......................... 10 2011 009 738

(51) Int. Cl.
*B60G 21/055* (2006.01)
*B60G 21/073* (2006.01)

(52) U.S. Cl.
USPC ................. 280/124.107; 280/5.511; 267/189; 267/279

(58) Field of Classification Search
USPC ......... 280/124.107, 124.152, 124.149, 5.511; 267/183, 186, 188, 189, 279, 280
See application file for complete search history.

(56) References Cited

U.S. PATENT DOCUMENTS

| 4,659,069 | A  | * | 4/1987 | Odobasic ...................... 267/280 |
| 6,076,840 | A  | * | 6/2000 | Kincaid et al. ......... 280/124.107 |
| 6,698,767 | B2 | * | 3/2004 | Hagan ......................... 280/5.511 |
| 7,150,458 | B2 | * | 12/2006 | Reichel et al. ............. 280/5.511 |
| 7,819,406 | B2 | * | 10/2010 | Beetz et al. ................ 280/5.511 |
| 7,909,342 | B2 | * | 3/2011 | Barth et al. ............ 280/124.107 |
| 7,931,281 | B2 | * | 4/2011 | Maeda et al. ............. 280/5.511 |
| 7,992,485 | B2 | * | 8/2011 | Lezock et al. .................... 92/31 |
| 2004/0217569 | A1 |  | 11/2004 | Gradu et al. |
| 2006/0236973 | A1 |  | 10/2006 | Seibt et al. |
| 2007/0062756 | A1 |  | 3/2007 | Seibt et al. |
| 2008/0023930 | A1 | * | 1/2008 | Anthon et al. ......... 280/124.107 |
| 2008/0106055 | A1 | * | 5/2008 | Pinkos et al. .......... 280/124.106 |
| 2010/0259024 | A1 | * | 10/2010 | Bidlake et al. ......... 280/124.101 |
| 2010/0300584 | A1 |  | 12/2010 | Buschsieweke et al. |

FOREIGN PATENT DOCUMENTS

| DE | 40 21 165 A1 | 2/1991 |
| DE | 102 31 013 A1 | 2/2004 |
| DE | 10 2006 051 682 A1 | 2/2008 |
| DE | 10 2009 020 249 A1 | 11/2010 |

* cited by examiner

*Primary Examiner* — Paul N Dickson
*Assistant Examiner* — Darlene P Condra
(74) *Attorney, Agent, or Firm* — Henry M. Feiereisen LLC

(57) ABSTRACT

A stabilizer coupling for use in a roll stabilizer for a motor vehicle has at least one actuator, with the actuator being formed by an outer profile element and an inner profile element. An elastically deformable body is arranged between the outer profile element and the inner profile element. The outer profile element is formed as a hollow profile component, in particular a hollow profile component constructed as an extruded profile and made from a light metal alloy.

12 Claims, 2 Drawing Sheets

STABILIZER COUPLING

CROSS-REFERENCES TO RELATED APPLICATIONS

This application claims the priority of German Patent Application, Serial No. 10 2011 009 738.4, filed Jan. 28, 2011, pursuant to 35 U.S.C. 119(a)-(d), the content of which is incorporated herein by reference in its entirety as if fully set forth herein.

BACKGROUND OF THE INVENTION

The present invention relates to a stabilizer coupling for use in a roll stabilizer for a motor vehicle.

The following discussion of related art is provided to assist the reader in understanding the advantages of the invention, and is not to be construed as an admission that this related art is prior art to this invention.

Stabilizers for roll stabilizing of motor vehicles are known in the art. These stabilizers are typically constructed as torsion components. One side of the stabilizer is coupled with the left wheel of the motor vehicle, whereas the other side of the stabilizer is coupled with the right wheel of a motor vehicle axle. If one wheel is deflected or rebounds, then this causes the stabilizer to twist.

The stabilizer maintains the rolling behavior of a motor vehicle in uncritical regions. Different driving characteristics can be generated or promoted, or alternatively suppressed, depending on the stabilizer design. For example, a particularly hard adjustment is indicated for a sporty driving characteristic, which significantly minimizes the rolling behavior and distributes the wheel load to all wheels for a firm grip. Advantageously, a stabilizer may sometimes be completely deactivated in an all-terrain vehicle, allowing the deflected and rebounding wheels to adapt to the uneven terrain.

Active stabilizers are known in the art which combine this divergence of the adjustment characteristic of different stabilizer properties in a single stabilizer. These active stabilizers typically include an electrically and/or hydraulically operated actuator which is actively intervenes in the torsion characteristic of the stabilizer. For example, a sports utility vehicle may have a soft stabilizer characteristic in the basic adjustment, allowing uneven roads to be traveled with strong ground contact by all four wheels. However, when a more sporty adjustment is selected, the active actuator motor twists the stabilizer more, which then causes a higher torsion stiffness and reduces the rolling behavior of the vehicle in curves traveled in a sporty dynamic fashion.

Disadvantageously, these active stabilizers systems are difficult to manufacture and are technically complex to operate. In addition, these systems have also a high weight due to the design of the actuators as well as of the sensor system and the control technologies. A system may also develop technical defects during operation affecting their durability.

In addition, semi-active stabilizers are known in the art where elastically coupled stabilizer halves cause different rolling behaviors of the vehicle, depending on the selection by the driver. Frequently, an elastomer or a hydraulic fluid is used for elastic coupling. Because the stabilizer transmits large torques, these components have a high weight, and are typically manufactured as expensive milled components.

It would therefore be desirable and advantageous to obviate prior art shortcomings and to provide an improved semi-active stabilizer which implements a dynamic rolling control and which can be produced more cost-effectively compared to conventional stabilizer arrangements, and which is durable and has a small weight.

SUMMARY OF THE INVENTION

According to one aspect of the present invention, a stabilizer coupling according to the invention for use in a roll stabilizer for a motor vehicle has at least one actuator, with the actuator being formed by an outer profile element and an inner profile element, and an elastically deformable body being arranged between the outer profile element and the inner profile element. the outer profile element is constructed as a hollow profile component, and the outer profile element and/or the inner profile element are formed as an extruded profile from a light metal alloy.

The term outer profile element refers to a profile element which is arranged on the stabilizer coupling farther to the outside or even on the outside surface of the stabilizer coupling, whereas an inner profile element is arranged on an interior surface or in the interior of the stabilizer coupling. The term hollow profile component within the context of the invention refers to a hollow profile component which is preferably cut to length from a profile bar. The hollow profile component is thus hollow inside and has in cross-section a profile. In particular, the profile is configured to form a positive lock with another profile, preferably by incorporating an intermediate elastic body and/or a fluid.

Within the context of the invention, the profile component may be made, for example, from a light metal, such as aluminum or even from steel or from a fiber composite material. The profile component itself may, for example, be extruded, milled or die cast. This provides a particularly cost-effective stabilizer coupling which has a modular construction due to the use of profile components in form of bulk stock. At the same time, a modular design principle can be implemented, so that a different torsion rate can be selected by, for example, cutting different inner and outer profile elements and elastically deformable bodies arranged therebetween to length.

By constructing the outer profile elements and/or the inner profile elements as extruded profile, the individual components have a particularly low weight compared to similar conventionally constructed components. In addition, the individual components can be produced more cost-effectively than milled components. Extruded profiles produced in a continuous process may be used, which in turn significantly reduces production costs, so that with the stabilizer coupling according to the invention, semi-active roll stabilizers can also be employed in vehicle classes that include compact and subcompact vehicles. Within the context of the invention, individual profile elements can also be formed as extruded plastic profiles.

According to one advantageous embodiment of the present invention, the stabilizer coupling according to the invention may coupled by a releasable screw connection. This reduces the cost and complexity in the manufacture and initial assembly. The system can then also be easily serviced and easily repaired when damaged. With the screw connection and the modular construction, the system can also be easily adapted for different vehicle types.

According to one advantageous embodiment of the present invention, the stabilizer coupling may be implemented as a double stabilizer coupling, wherein the two stabilizer couplings may be coupled with one another via a sleeve component, and wherein the sleeve component may be made from a light metal. The sleeve component may also be made from plastic and/or from a fiber composite material. According to one advantageous embodiment of the present invention, the sleeve component may also be formed as an extruded profile or as a profile component produced in other ways. This yields similar advantages for manufacturability and, a weight-optimized design as the advantages previously described for the outer profile element and the inner profile element. Advantageously, the sleeve component may also be formed from plastic or fiber composite materials.

According to another advantageous embodiment of the present invention, pressure may be applied to the elastic body arranged in the stabilizer coupling, in particular with a fluid. According to one advantageous embodiment of the present invention, the elastic body may be an elastically deformable hollow body to which an interior pressure is applied; the hollow body creates a coupling between the outer profile element and the inner profile element which indirectly or directly transmits torque. By employing different elastic bodies, in particular in a double stabilizer coupling, the stabilizer coupling can then not only be arranged at the center of a stabilizer or a motor vehicle axle, respectively, but also arranged asymmetrically, thereby allowing wheel lifting power of different strengths to be equalized.

In particular, the stabilizer double coupling operates by twisting one stabilizer half, whereby the torque is transmitted via the deformable body to the sleeve component and in turn via the second deformable body to the other stabilizer half. The extent with which the torque is transmitted, attenuated or influenced can be controlled by the coupling between the two actuators.

According to yet another advantageous embodiment of the present invention, a centerpiece may be arranged in the sleeve component. The centerpiece may be designed to separate the two stabilizer couplings from each other spatially or fluid-tight. The centerpiece may also be constructed as a connecting block. According to one advantageous embodiment of the present invention, the connecting block may be inserted, thereby spatially separating the two actuators from each other. Advantageously, the actuators may additionally be separated fluid-tight.

For active control, the two stabilizer couplings of a double stabilizer coupling may advantageously be coupled with one another via a pressure channel. Advantageously, the fluids residing in the elastic bodies are in fluid communication via the pressure channel. Pressure between the two spatially separated, adjacent elastic bodies is equalized commensurate with the design of the fluid channel.

In operation, a rotation-direction-dependent rotation of the inner profile element with respect to the outer profile element or the sleeve component, respectively, deforms the hollow body, which changes the internal volume. When the inner profile element is rotated relative to the sleeve component, different pressures are produced on the respective side between the interlocked outer profile element and the inner profile element. The fluid in the elastically deformable bodies is then spatially displaced, forcing it to flow, thus equalizing pressure. According to one advantageous embodiment of the present invention, the flow characteristic may, for example, also be actively controlled with a control valve. The flow can then control the damping rate and/or the intensity of the torque transmission.

According to one advantageous embodiment of the present invention, the control valve itself may be connected with the pressure channel or may, in another exemplary embodiment, be arranged in the centerpiece. The rolling behavior of the motor vehicle can be actively controlled with the control valve by way of the stabilizer coupling according to the invention.

According to another advantageous embodiment of the present invention, the outer profile element and the inner profile element may be coupled with the centerpiece and/or with the sleeve component by a positive connection and/or a material connection. This facilitates manufacturing, because the individual components can be particularly easily manufactured and assembled at the initial assembly stage or during repair and maintenance work.

Advantageously, screw connections or adhesive joints may also be used. In addition, a rivet joint between the individual components may be contemplated. In addition, press-fit connections or flanged connections may be used with the individual hollow profile components.

According to another advantageous embodiment of the present invention, the outer profile element may be coupled with the centerpiece by a screw connection. In this embodiment, a sealing cover may be arranged on the side of the outer profile element facing the centerpiece. With this approach, a particularly cost-effective and simple initial assembly can then be realized, accompanied by high pressure-tightness and durability of the system.

According to yet another advantageous embodiment of the present invention, the inner profile element may penetrate at least portions of the sealing cover, wherein a flange may be connected to the inner profile element for coupling with a stabilizer section. The stabilizer coupling can then be easily uninstalled from the stabilizer installed in the motor vehicle during subsequent maintenance and repair work. The initial installation and the structure are hereby simplified, while the entire system has a high tightness, even when torque is transmitted over many years.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
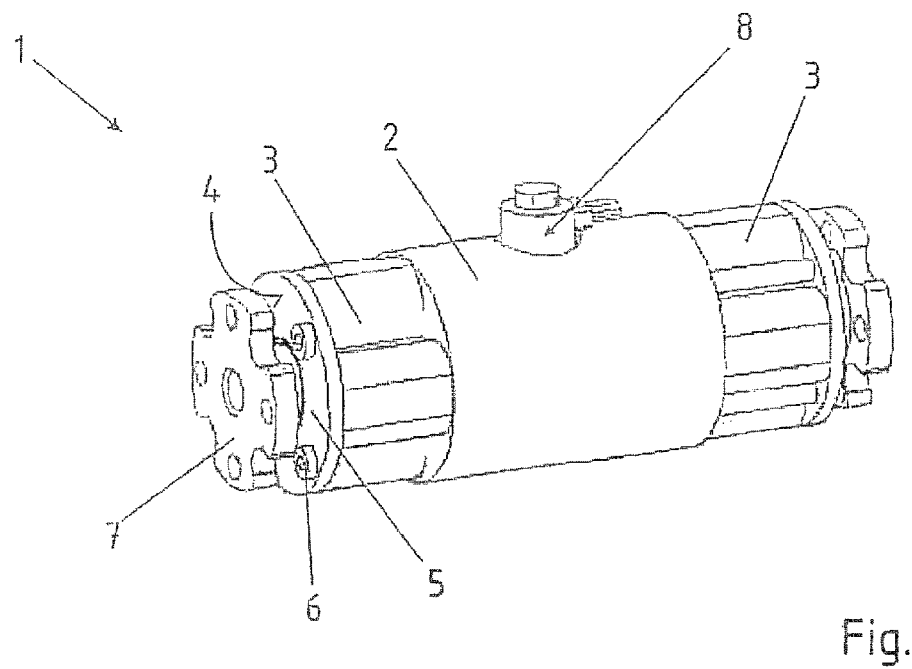
FIG. 1 shows a perspective diagram of a stabilizer coupling according to the invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a perspective view of a stabilizer coupling 1. The stabilizer coupling 1 includes a sleeve component 2, from which two outer profile elements 3 extend. The outer profile elements 3 are each screwed to the sleeve component 2 at an end face 4 by way of a sealing cover 5. In addition, a flange 7 is arranged at each end face. As can also be seen, a control valve 8 is arranged centrally in the sleeve component 2.

Figure 2:
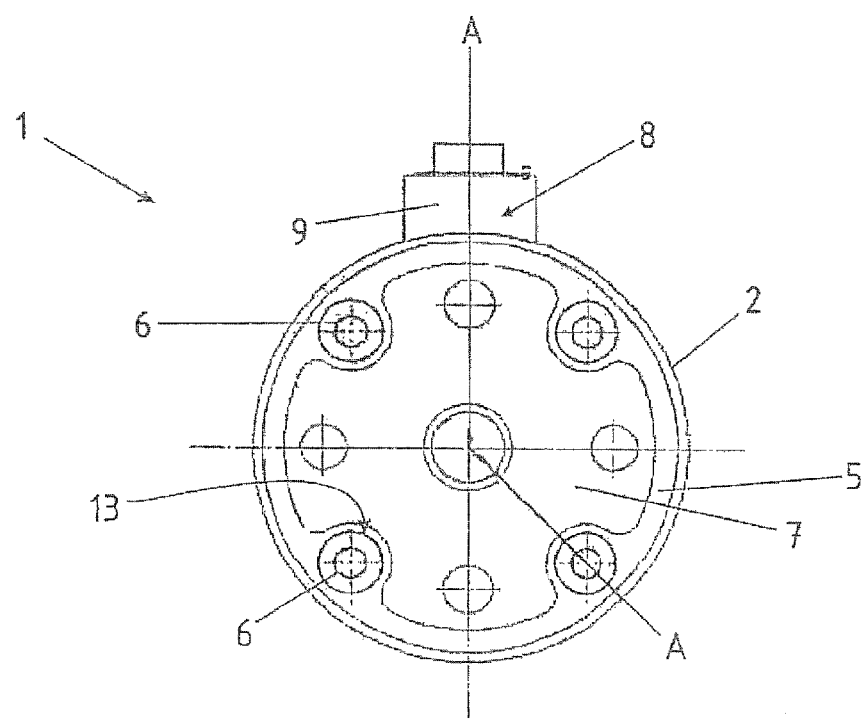
FIG. 2 shows a frontal view onto the stabilizer coupling.

FIG. 2 shows a frontal view of the stabilizer coupling 1 according to the invention. As can be seen, the sealing cover 5 is coupled to the sleeve component 2 with four screw connections 6. The control valve 8 has a base 9. In addition, the flange 7 is arranged in front of the sealing cover 5.

Figure 3:
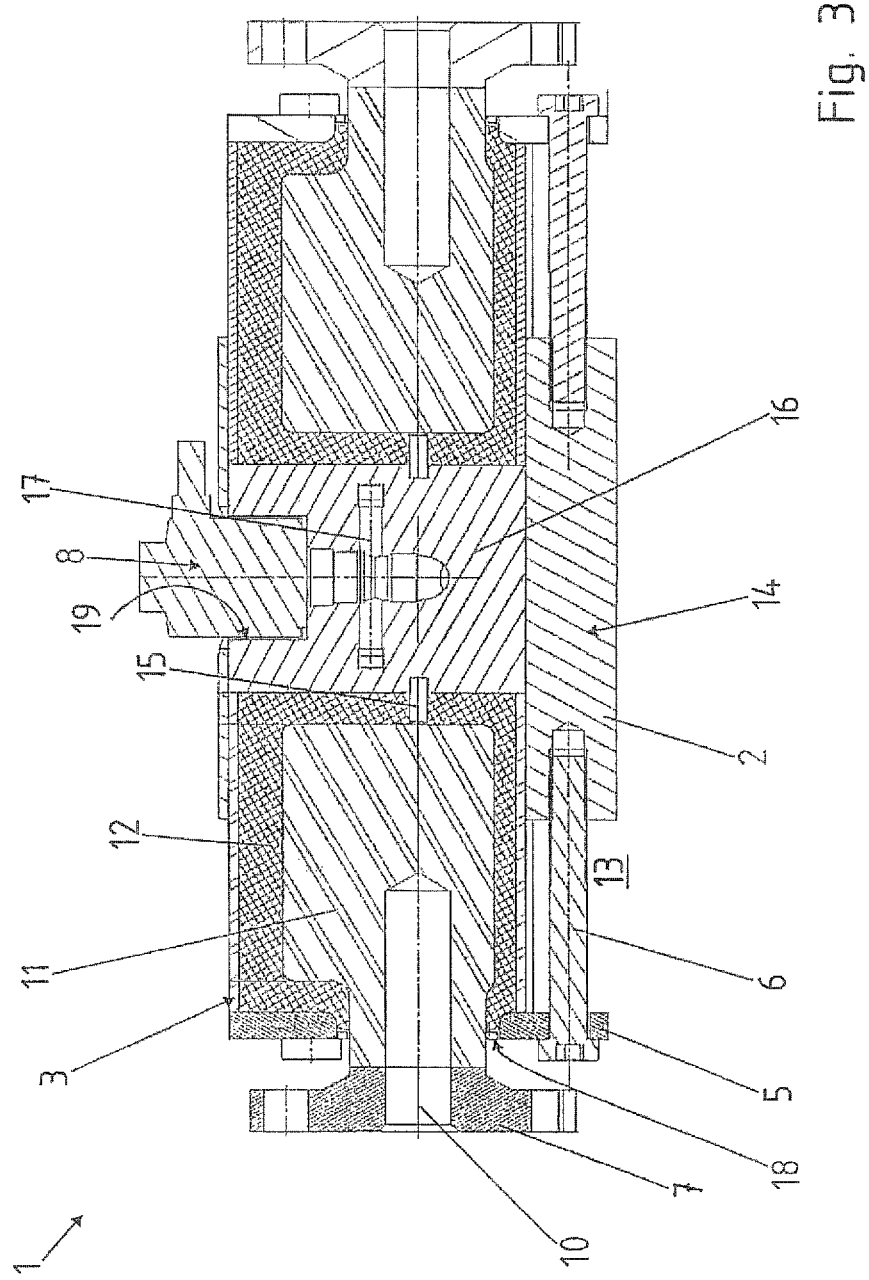
FIG. 3 shows a longitudinal cross-section through the stabilizer coupling taken along the line A-A in FIG. 2.

FIG. 3 shows a cross-sectional view of the stabilizer coupling taken along the line A-A in FIG. 2. The following structure can be identified, as viewed onto the drawing plane from left to right to the center: a flange 7 connecting an unillustrated stabilizer, which is coupled with an inner profile element 11. The inner profile element 11 is in turn coupled with the outer profile element 3 via an elastically deformable body 12. The inner profile element 11 penetrates hereby the sealing cover 5, which is penetrated farther towards the top by the screw connections 6 for coupling with the sleeve component 2. A recess 13, which in the diagram of FIG. 2 forms a tooth profile, is arranged on the outer profile element 3 in the region of the screw connection 6.

The sleeve component 2 itself has in the region of the screw connection 6 a bulge 14, which in cooperation with the recess 13 of the outer profile element 3 enables a formfitting tooth engagement between the outer profile element 3 and the sleeve component 2. A channel connection opening 15 is arranged at the center of each outer profile element 3. A fluid, which is not illustrated in detail, resides inside the elastically deformable body 12 and is connected with the second stabilizer coupling on the right side via the channel connection opening 15 and a pressure channel 17. This connection extends in the present the illustrated exemplary embodiment orthogonal to the drawing plane, so that a direct connection is not shown.

In addition, a centerpiece 16 is inserted which spatially separates the two stabilizer couplings in the sleeve component 2. The pressure channel 17, which connects the two elastically deformable bodies 12 with each other, is located in the centerpiece 16. The control valve 8 which simultaneously engages in the pressure channel 17 is also arranged in the centerpiece 16. This allows control of the pressure equalization. The control valve 8 is arranged in a bore 19 formed in the centerpiece 16 and also in the sleeve component 2. The control valve 8 can be screwed into the bore 19, as well as pressed or glued into the bore 19.

In addition, a seal 18 which seals the elastically deformable body towards the outside and prevents intrusion of contamination is arranged at the outer ends of the outer profile elements.

When a torque is applied to the flange 7, the inner profile element 11 rotates relative to the outer profile element 3. The relative motion is compensated by the elastically deformable body 12 arranged between the profile elements 3, 11 which are intermeshed in the radial direction. The unillustrated fluid residing in the elastically deformable body 12 is then subjected to pressure which equalizes with the pressure in the second elastically deformable body through the channel connection opening 15 and the pressure channel 17. The torsion stiffness or torsion damping can be controlled with the geometric design of the pressure channel 17 or via the control valve 8.

Preferably, additional sealing elements, radial shaft seals and sealing washers are arranged in the centerpiece 16 and/or between the centerpiece 16 and the elastically deformable body 12. These establish a fluid connection between the left elastically deformable body 12 and the right elastically deformable body 12.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A stabilizer coupling for a roll stabilizer for a motor vehicle, comprising:
    a sleeve element;
    an outer profile element formed as a hollow profile component and received in the sleeve element,
    an inner profile element, which in conjunction with the outer profile element forms at least one actuator,
    an elastically deformable body arranged between the outer profile element and the inner profile element,
    a centerpiece arranged in the sleeve component and configured to provide a fluid-tight separation in the sleeve component against a further stabilizer coupling, said outer profile element being coupled with the centerpiece by a screw connection, and
    a sealing cover arranged on a side of the outer profile element facing the centerpiece.

2. The stabilizer coupling of claim 1 wherein at least one of the outer profile element and the inner profile element is formed as an extruded profile from a light metal alloy.

3. The stabilizer coupling of claim 1, wherein the two stabilizer couplings form a double stabilizer coupling, with the sleeve component coupling the two stabilizer couplings with each other.

4. The stabilizer coupling of claim 3, wherein the sleeve component is constructed from a material selected from a light metal, a plastic material and a fiber composite material.

5. The stabilizer coupling of claim 3, wherein the two stabilizer couplings are coupled with each other via a pressure channel.

6. The stabilizer coupling of claim 5, further comprising a control valve in fluid communication with the pressure channel.

7. The stabilizer coupling of claim 6, wherein the control valve is arranged in a centerpiece separating the two stabilizer couplings.

8. The stabilizer coupling of claim 6, wherein the control valve is actively controlled.

9. The stabilizer coupling of claim 1, wherein pressure is applied to the elastically deformable body.

10. The stabilizer coupling of claim 9, wherein the pressure is applied with a fluid.

11. The stabilizer coupling of claim 1, wherein the outer profile element or the inner profile element is connected with the centerpiece or with the sleeve component, or with both, by at least one of a formfitting connection and a material connection.

12. The stabilizer coupling of claim 1, wherein the inner profile element extends at least partially through the sealing cover, the stabilizer coupling further comprising a flange coupled with the inner profile element for attachment to a stabilizer section of the roll stabilizer.

* * * * *